W. S. MORTON.
STEERING AND STARTING MECHANISM FOR TRACTORS.
APPLICATION FILED OCT. 30, 1915.
1,274,434.
Patented Aug. 6, 1918.
2 SHEETS—SHEET 2.
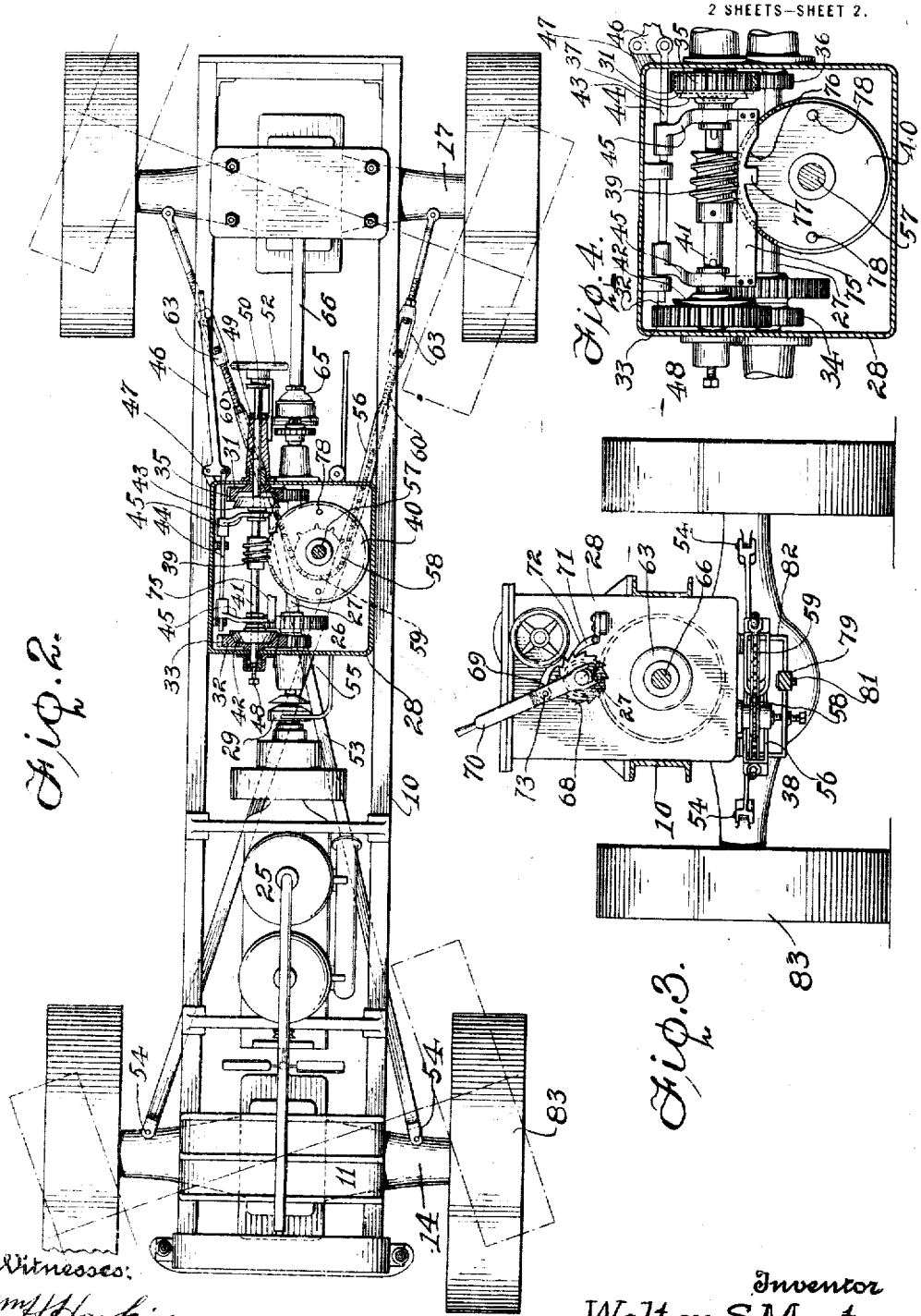

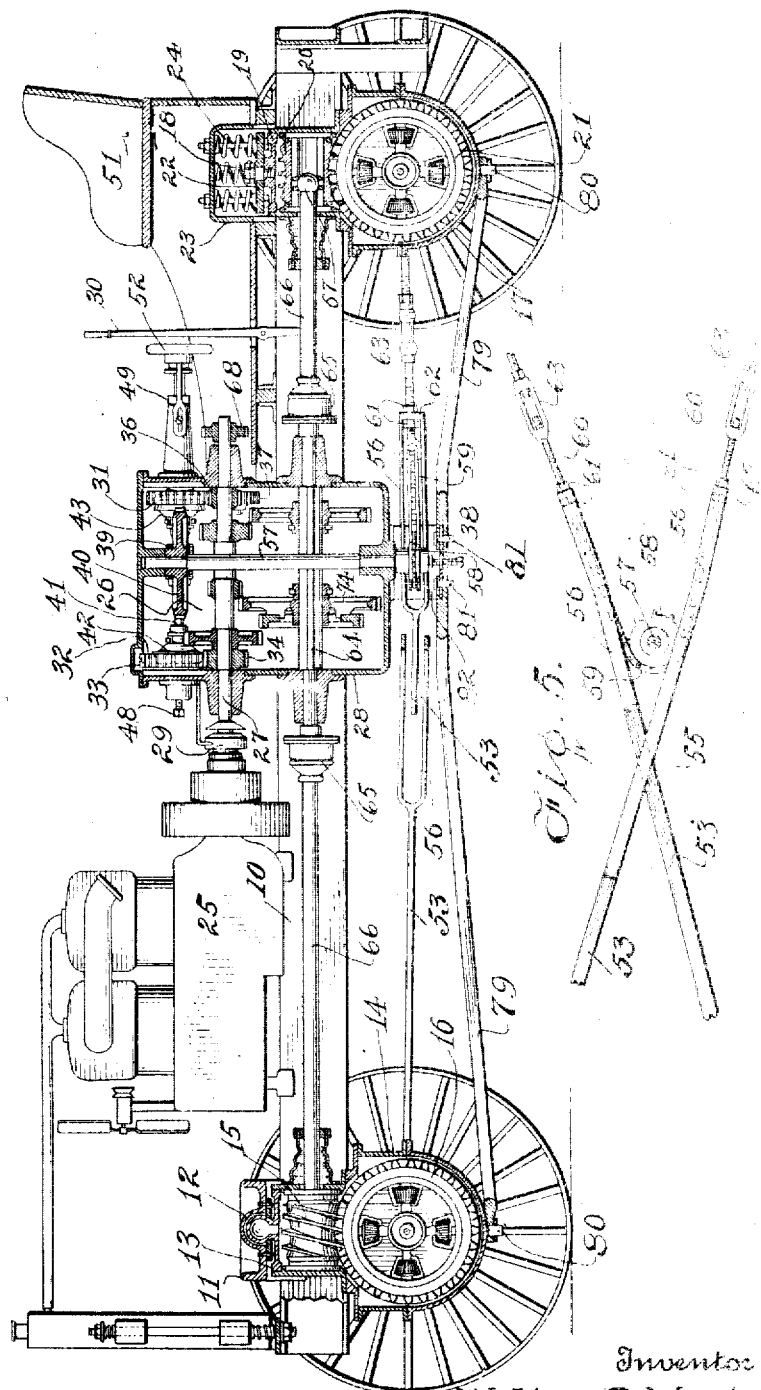

UNITED STATES PATENT OFFICE.

WALTER S. MORTON, OF HARRISBURG, PENNSYLVANIA.

STEERING AND STARTING MECHANISM FOR TRACTORS.

1,274,434.  Specification of Letters Patent.  Patented Aug. 6, 1918.

Application filed October 30, 1915. Serial No. 58,823.

*To all whom it may concern:*

Be it known that I, WALTER S. MORTON, a citizen of the United States, residing at Harrisburg, in the county of Dauphin and State of Pennsylvania, have invented new and useful Improvements in Steering and Starting Mechanism for Tractors, of which the following is a specification.

This invention relates to motor-driven trucks or tractors of the heavy type used for hauling large loads and especially to the steering and starting mechanism for such vehicles.

This truck or tractor is of the four-wheel drive type and both axles are mounted to swing in a front and rear direction in steering the vehicle, and a driving connection is maintained to the wheels in any position the axles may assume in steering.

A principal object of the invention is to provide a truck or tractor of the type mentioned with a very simple steering means which operates in such a way that the vehicle may be steered at any moment at will by hand or by the application of power from the motor, and without necessitating the disconnection or adjustment of any part of the mechanism.

A further object of the invention is to provide improved means for connecting the axles so that they will swing in unison and also to provide improved means for applying the steering power to the axles.

Trucks or tractors of the heavy type referred to are frequently used on bad roads or in places where the vehicle is likely to become stalled. In order to meet this difficulty, one of the objects of the invention is to provide improved means for applying hand power advantageously with a high leverage to drive the wheels of the vehicle slowly but powerfully, and in such a way as to assist in dislodging the wheels when stalled.

Where a motor truck or tractor, such as described, is stalled, it may be desirable to shift the axles slightly in the process of dislodging the wheels, and in this connection one of the objects of the invention is to construct the mechanism in such a way that hand power may be applied very advantageously and with a high leverage to effect the swinging of the axles as suggested, the general purpose of this mechanism being to give a greater leverage or purchase to the hand power than that which resides in the regular hand-steering gear.

Further objects of the invention will appear more fully hereinafter.

The invention consists in the general combination of parts and details described hereinafter, all of which contribute to produce an efficient steering and starting mechanism for tractors.

A preferred embodiment of the invention is described in the following specification, while the broad scope of the invention is pointed out in the appended claims.

In the drawing,

Figure 1 is a side elevation and partial section illustrating an embodiment of my invention.

Fig. 2 is a plan of the truck or tractor shown in Fig. 1, certain parts being shown in cross-section, and other parts being omitted for the sake of clearness.

Fig. 3 is a cross-section taken across the frame just to the rear of the transmission case.

Fig. 4 is a plan upon an enlarged scale, showing details of the steering mechanism.

Fig. 5 is a detail plan of the steering connections between the axles.

The truck or tractor illustrated comprises a frame 10 of any suitable construction, preferably provided at its forward end with a transverse bar or bolster 11 which has a ball-and-socket joint 12, with a gear case 13 which is rigid with and attached to the upper side of the forward axle 14. This gear case in the present embodiment of the invention carries a worm 15 which drives the differential 16 of the forward axle. This ball-and-socket joint 12 evidently permits the forward axle to swing in a front and rear direction, and also permits a considerable swinging movement of the axle in a substantially vertical plane. It is understood however that the manner of connecting the wheel axles 14 and 17 to the frame 10 is a matter of detail, except that it is important that each axle should be able to swing substantially horizontally in a front and rear direction about a fixed axis on the frame.

The rear axle 17 may be attached to the frame in any suitable manner, but preferably through the medium of a pivot pin 18 which is mounted in the upper side of a gear case 19 which carries a worm 20 similar to the worm 15, which worm meshes with and drives the differential gearing 21 in the rear axle 17. The pivot pin 18 is preferably rotatably mounted in the pivot plate 22 which is received in a box or housing 23 secured to the frame and this plate yieldingly supports the frame through the medium of springs 24 disposed within the box or case 23. These springs permit an up-and-down yielding movement of the frame on the rear axle. At a suitable point on the frame, a motor 25 is supported and this motor operates to drive transmission mechanism 26 by driving the shaft 27 mounted in the transmission case 28.

Between the shaft 27 and the motor, a clutch 29 is provided which may be thrown open or closed at will by means of a clutch lever 30 connected in any suitable manner with the clutch 29. When the clutch is closed, the shaft 27 rotates, and the arrangement is such that motion can be transmitted from this shaft 27 to the steering gear in either direction so as to swing the axles in a direction to steer the tractor to the right or to the left. This is preferably accomplished by means of two clutch members 31 and 32, the latter of which has gear teeth 33 meshing directly with a pinion 34 on shaft 27. The clutch member 31 has gear teeth 35; however, they do not mesh directly with the driving pinion 36 on the shaft 27, but they do mesh with an idle gear 37 which meshes with pinion 36 and is driven thereby.

From this arrangement evidently the clutch members 31 and 32 are constantly driven in opposite directions when the clutch 29 is closed. The steering mechanism 38 is preferably actuated by power mechanism including a driving member 39 which may be in the form of a worm as shown, said worm meshing with a worm wheel 40 which is connected with the steering mechanism 38 so as to swing the axles in the manner which will be described more in detail hereinafter.

The driving member or worm 39 for driving the steering mechanism is preferably rigidly mounted on a power-driven shaft 41 and this power-driven shaft carries slidable clutch members 42 and 43 which coöperate respectively with the clutch members 32 and 31. These clutch members 42 and 43 are splined on the shaft 41 and are arranged to be slid simultaneously on the power shaft so that when one clutch is in engagement with its corresponding clutch member, the other clutch composed of the opposite clutch members is open.

In order to shift the clutch members in this way, I prefer to provide a shifting bar 44 carrying rigid arms 45 which engage collars on the clutch members 42 and 43. The bar 44 may be slid longitudinally in either direction in any suitable manner such as by means of a hand lever 46 connected with the end of the bar and pivotally mounted at 47 on the transmission case. In order to prevent the shaft 41 from shifting longitudinally, it is provided at its forward end with an adjusting screw 48 and at its rear end with a collar 49 which abuts against a small shoulder formed on the shaft at 50. The shaft 41 extends from the case to a convenient point to be reached from the driver's seat 51 and is there provided with a suitable hand wheel 52 by means of which the worm 39 can be rotated by hand. With this arrangement evidently the hand-steering wheel 52 is constantly connected to the steering mechanism and evidently the driver of the tractor can apply motor power or hand steering at will as desired, and furthermore, he can do this without disconnecting any part from its normal position.

The steering mechanism 38 preferably comprises a pair of crossed connecting members, preferably in the form of links 53 the forward ends of which are pivotally attached as at 54 to the forward axle 14 and the rear ends of which are similarly attached to the rear axle 17.

Between the crossing point 55 of the connecting members and the rear axle, the links or connecting members 53 are preferably formed with bifurcated portions 56. When the worm wheel 40 is rotated in one direction or the other, its shaft 57 rotates its attached sprocket wheel 58 about which passes a sprocket chain 59, and the end portions of this chain extend longitudinally with the connecting members 53 and the ends are anchored to adjusting screws 60 at the ends of the bifurcated portions 56. The adjusting screws 60 are provided with nuts 61 on each side of the end or head 62 of the bifurcated portion so that by screwing the nuts in one direction or the other, the end of the chain can be adjusted to shorten or lengthen the chain. In order to adjust the lengths of the connecting members 53 so as to adjust the positions of the axles in relation to each other, I prefer to form the ends of the connecting members 53 with turn buckles 63. One end of each of these turn buckles is attached on the threads of each of the aforesaid adjusting screws 60. Evidently, these turn buckles 63 afford means for adjusting the length of the connecting members 53 without changing the adjustment of the chain itself with relation to the members 53.

The shaft 27 of the transmission mechanism, through suitable change speed gears, drives a driven transmission shaft 64, and the ends of this shaft are connected by suitable flexible couplings 65 with driving shafts 66 which have flexible connections 67 with the interior of the worms 15 and 20, in this way enabling the differentials 16 and 21 to be driven in any position the axles may assume.

In order to enable the driven transmission shaft 64 to be rotated very advantageously by hand power when the clutch 29 is open, I prefer to extend the shaft 27 from the transmission case and provide a hand power device giving a relatively large leverage for rotating this shaft. For this purpose, in the present embodiment, I have illustrated a ratchet wheel 68 with which coöperates a pawl 69 carried by a lever 70, said lever being mounted to rock on the axis of the shaft 27. Evidently, when the clutch is closed, this lever 70 may be employed to start the engine. In case there should be a "kick-back" which sometimes occurs in cranking an explosion engine, the pawl 69 automatically throws itself out. For this purpose, there is provided a detent pawl 71 which engages with the ratchet pawl and which is in the path of the nose of the pawl 69 so that if a backward rotation of the lever 70 occurs, the nose of the pawl strikes the curved upper edge 72 of the detent pawl and this rotates the pawl 69 on its pivot 73 and releases it from the ratchet.

When the clutch 29 is open, this lever 70 evidently affords means for advantageously applying hand power to rotate the wheels of the vehicle. This will occur, of course, if any of the transmission gears 74 are in mesh with the corresponding driving gears on the shaft 27. By this means a tractor of this construction, when stalled, can be moved for its wheels may be slowly rotated, and this may be very useful in moving the vehicle away from its stalled position.

The lever 70 may also be employed for swinging the axles when desired without the use of power, and without the use of the regular steering gear. It is advantageous to employ the lever 70 for this purpose, because a much greater leverage or purchase results from the use of the lever.

I prefer to provide means for automatically throwing out the power steering drive connection in case the operator omits to throw it open of his own accord when the axles have about reached the limit of their movement in steering. For this purpose I prefer to connect the shifting arms 45 with a bar 75, (see Fig. 4), and near its middle point this bar has gaps 76 formed in its edge, leaving a tongue 77. The upper side of the worm 40 is provided with two upwardly extending projecting pins 78 which are substantially diametrically opposite to each other, in the present embodiment. Whatever be the direction of steering, one of these pins will travel toward the tongue 77 and if the power drive is not thrown open by the driver at the proper time, the pins will strike the tongue 77 and shift the bar 75 longitudinally. This shifts the arms 45 and opens whichever clutch is driving the worm wheel.

I provide means for bracing the under sides of the axles 14 and 17, and for this purpose I prefer to provide longitudinally disposed braces or bars 79, the forward and rear ends of which are pivotally attached at 80 to the under sides of the axles and the inner ends of which are pivotally attached at 81 to a bracket 82, attached to the under side of the transmission case, and which also forms a guard for the sprocket wheel 58. The mode of operation of the mechanism is substantially as follows:

If the power steering lever 46 is moved in one direction or the other, the shift bar 44 will be shifted, for example, toward the left as in Fig. 2. This will close the clutch composed of the clutch members 32 and 42. This will cause the worm shaft 41 to rotate, and the rotation of the worm 39 rotates worm wheel 40, and the spindle 57. This rotates sprocket wheel 58 which takes up the chain 59 on one side and pays it out on the other side. In this way a pull is exerted on one of the connecting members 53, and the other connecting member which crosses it is released or paid out. This evidently will swing one axle in one direction and the other axle in the other direction, so that they may assume a position such as that indicated in dotted lines in Fig. 2. If the operator omits to throw out the power-steering mechanism, it will be thrown out automatically by the pins 78 coöperating with the bar 75 in the manner just described above.

Evidently when both of the steering clutch members 42 and 43 are in their open position, the steering may be effected by hand power by rotating the hand wheel 52 by hand.

When the clutch 29 is thrown open and the transmission gears are connected with each other, the lever 70 will afford means for giving the wheels 83 a slight rotation. If the transmission gears are thrown out of connection and one or the other of the steering clutch members 42 or 43 closed, then the lever 70 affords means for swinging the axles in a front and rear direction.

Special attention is called to the fact that each of the driving worms 15 and 20 is disposed directly over the axis on which its corresponding axle swings in steering the vehicle. This feature, coöperating with the flexible connections for driving the worms from the drive shafts 66, enables the driving connection to all four wheels to be maintained in any position the axles may assume in steering the vehicle.

It is understood that the embodiment of the invention set forth herein is only one of the many embodiments or forms the invention may take, and I do not wish to be limited in the practice of the invention nor in my claims to the particular embodiment set forth. And I may use any feature of my invention without the other features.

What I claim is:

1. In a motor-driven vehicle, in combination, a frame, a motor supported thereupon, a power-steering shaft, driving means for driving the same in either direction from said motor, a driving member on said shaft, steering mechanism actuated thereby, said driving means for driving said power-steering shaft from said motor including clutches corresponding respectively to two directions of driving the power-steering shaft, means for closing either of said clutches at will, including a hand-operated shifting device, said shifting device including a bar, a member adjacent said bar connected with the axles and arranged to rotate in steering the vehicle and means carried by said last named member for engaging said bar for throwing either of said clutches open at the limit of the steering movement, and means constantly connected with said power steering shaft for rotating the same by hand when both clutches are open.

2. In a motor-driven vehicle, in combination, a frame, a motor mounted upon said frame, transmission mechanism, a clutch for driving the transmission mechanism from said motor, means for controlling the activity of the clutch, said transmission mechanism including driven gears for driving the wheels of the vehicle, and a hand-power device independent of the clutch controlling means and operatively connected with the gears of the transmission mechanism to rotate the wheels of the vehicle when said clutch is open.

3. In a motor-driven vehicle, in combination, a frame, a motor mounted upon said frame, transmission mechanism, a clutch for driving the transmission mechanism from said motor, said transmission mechanism including driven gears for driving the wheels of the vehicle, and a hand-power device comprising a ratchet, a pawl and an operating lever therefor, connected with the gears of the transmission mechanism to rotate the wheels of the vehicle when said clutch is open.

4. In a motor-driven vehicle, in combination, a frame, a motor mounted upon said frame, transmission mechanism, a clutch for driving the transmission mechanism from said motor, said transmission mechanism including driven gears for driving the wheels of the vehicle and having a neutral position in which the driven gears are ineffective to drive the wheels of the vehicle, axles for the vehicle wheels, mounted on the frame to swing in a front and rear direction in steering the vehicle, steering mechanism driven by the transmission mechanism for swinging the axles in steering, and a hand-power device connected with the transmission mechanism to actuate the same to swing the axles when said clutch is open.

5. In a motor-driven vehicle, in combination, a frame, a motor mounted upon said frame, transmission mechanism driven by said motor, a clutch member driven in one direction by said transmission mechanism, another clutch member driven in the opposite direction by said transmission mechanism, steering mechanism, a driving member therefor, clutch members coöperating with the aforesaid clutch members to drive said driving member in either direction by said motor, and hand-operated means for holding said second named clutch members in their open position and means for actuating said driving member to steer directly by hand.

6. In a motor-driven vehicle and in combination, transmission mechanism, traction drive mechanism operated thereby, steering mechanism operatively extending into said transmission mechanism to permit steering by power at will, a motor, clutch connections between said motor and transmission mechanism, and manually operable means extending into said transmission mechanism beyond said clutch and adapted to provide transmission mechanism operation when the clutch is disengaged, whereby either or both traction drive or steering action may be had manually during clutch inactivity.

In testimony whereof I have hereunto set my hand in presence of two subscribing witnesses.

WALTER S. MORTON.

Witnesses:
A. C. WHALEN,
ROBT. L. MORTON.